United States Patent [19]

Zalameda et al.

[11] Patent Number: 5,508,546
[45] Date of Patent: Apr. 16, 1996

[54] ACTIVE PYROELECTRIC INFRARED DETECTOR

[75] Inventors: Joseph N. Zalameda, Williamsburg; Allan J. Zuckerwar; Joseph M. Mina, both of Newport News all of Va.

[73] Assignee: The United States of America as represented by the Adiministrator of the National Aeronautics and Space Administration, Washington, D.C.

[21] Appl. No.: 380,176

[22] Filed: Jan. 30, 1995

[51] Int. Cl.$^6$ ...................................................... G01J 5/10
[52] U.S. Cl. ...................................... 250/338.3; 374/117
[58] Field of Search ........................ 250/338.3; 374/117

[56] References Cited

U.S. PATENT DOCUMENTS

| | | |
|---|---|---|
| 4,383,174 | 5/1983 | Matsummura et al. . |
| 4,797,840 | 1/1989 | Fraden . |
| 4,806,760 | 2/1989 | McGlade .................................. 250/330 |
| 5,108,576 | 4/1992 | Malmros et al. . |
| 5,159,936 | 11/1992 | Yelderman et al. . |

FOREIGN PATENT DOCUMENTS 1448222  12/1988  U.S.S.R. ................................ 374/117

*Primary Examiner*—Constantine Hannaher
*Attorney, Agent, or Firm*—George F. Helfrich; Robert C. F. Perez

[57] ABSTRACT

A noncontact pyroelectric infrared detector is described. A pyroelectric film that also has piezoelectric properties is held in place so that it is free to vibrate. It is electrically stimulated to vibrate at a resonance frequency. The vibrating film forms part of a balanced bridge circuit. As thermal radiation impinges on the film the pyroelectric effect causes the resonance frequency to change, thereby unbalancing the bridge circuit. A differential amplifier tracks the change in voltage across the bridge. The resulting voltage signal is further processed by a bandpass filter and a precision rectifier. The device allows for DC or static temperature measurements without the use of a mechanical chopping device.

9 Claims, 3 Drawing Sheets

CONCEIVED PLL DESIGN

ACTIVE PYROELECTRIC INFRARED DETECTOR

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

1. Field of the Invention

The invention relates generally to the field of temperature measurement and specifically to the field of pyroelectric infrared radiation detection.

2. Description of the Related Art

Noncontact temperature measurements are possible through the detection of infrared radiation. Many different detectors are available to convert infrared radiation into an electrical signal. There are two main types of detector, thermal and quantum. Thermal detectors operate by a change in the detector's electrical characteristics caused by the infrared radiation directly heating the material. This type of detector has wavelength independent response and can be operated without cooling. Quantum detectors offer an increase in sensitivity over thermal detectors as well as faster response times, but require cooling to liquid nitrogen or helium temperatures.

There are four main types of thermal detector, thermopile, pneumatic, thermistor and pyroelectric. Thermopile detectors operate on the same principle as do thermocouples in which voltage output is produced by the Seebeck effect. That is, a voltage potential is produced by two dissimilar metals that are connected and heated. These detectors have good sensitivity and a DC response, but suffer from slow response times. The DC response allows for static temperature measurements. A pneumatic detector utilizes the expansion of a gas as it is heated. The gas chamber forms the dielectric for a capacitor which undergoes a change in capacitance as the gas expands. These detectors also give good sensitivity and a DC response but they lack durability. Thermistor detectors operate on the principle that resistance is a function of temperature, as the thermistor heats up its resistance changes giving a relatively fast response time and a DC response but they suffer from a lower sensitivity. In a pyroelectric detector, incident infrared radiation causes a change in polarization in the pyroelectric material producing a voltage. These detectors give fast response times and good sensitivity but lack a DC response. It is known that through use of a mechanical chopper it is possible to obtain a DC response using a pyroelectric detector. The mechanical method however also limits the detector's response time.

Pyroelectric detectors have been used to make static measurements in the human body, Fraden (U.S. Pat. No. 4,797,840) describes a noncontact device for measuring the tympanic temperature. This patent is herein incorporated by reference. Fraden uses pyroelectric materials in a passive manner.

SUMMARY OF THE INVENTION

One object of the present invention is to present a device for making noncontact temperature measurements, such that the device is capable of making static as well as dynamic measurements and capable of operating without cryogenic cooling nor making use of a mechanical chopper.

A further object of this device is to make measurements more precisely than other pyroelectric devices.

To achieve the forgoing objects, a foil having both pyroelectric and piezoelectric properties is used as the detecting means. By foil is meant a thin sheet of any substance having pyroelectric and piezoelectric properties, including for example a polymer film or ceramic. By applying an oscillating voltage to the foil, it is set into resonant vibration as a result of its piezoelectric property. The resonance frequency of the foil is dependent on the geometry of the foil, the tension with which it is fastened to the resonator assembly and the material properties of the foil. The foil forms a portion of a balanced bridge circuit. As infrared radiation hits the foil, the bridge circuit is put out of balance. This imbalance is measured and indicates the temperature of interest.

As described above the device may be used to detect infrared radiation. To make an absolute temperature measurement a standard would be employed to calibrate the infrared information and assign a corresponding temperature to a given reading. An example of this is calibrating the detector's response using a black body radiation source over a given temperature range. This would allow for absolute temperature measurements.

A thin foil is chosen for the detector because it is desirable to have a low thermal mass for the detector itself. This allows for a faster response time than would be possible with a detector having a high thermal mass.

In prior art pyroelectric detectors the measurement is made by observing changes in voltage produced through the pyroelectric effect. In the present invention a greater precision is achieved by observing frequency information instead of voltage. Frequency information may be electronically monitored more precisely than can voltage signals.

DESCRIPTION OF THE PREFERRED EMBODIMENTS

Figure 1:
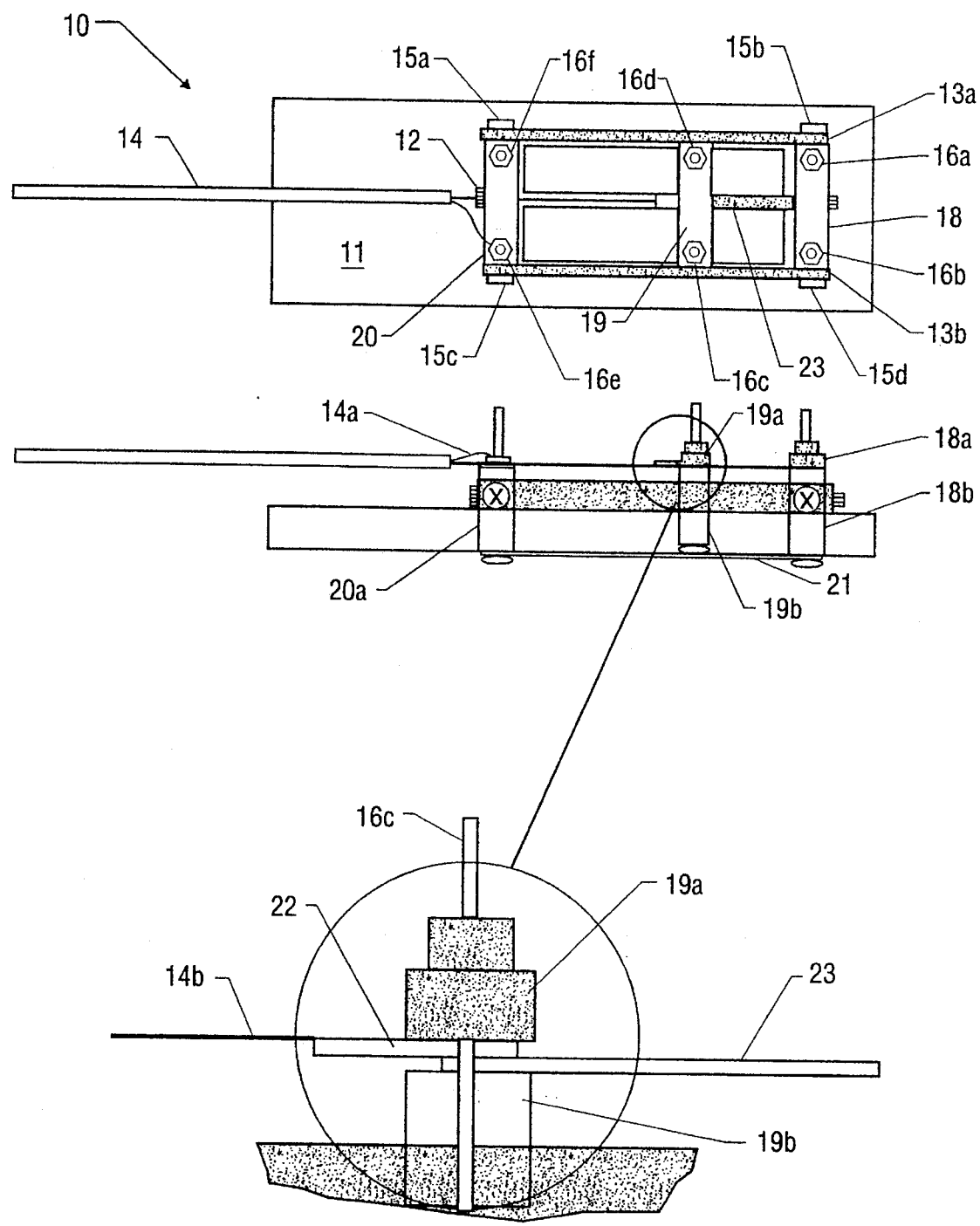
FIG. 1 is a drawing of an assembly to hold the foil as it is resonated.
Figure 2:
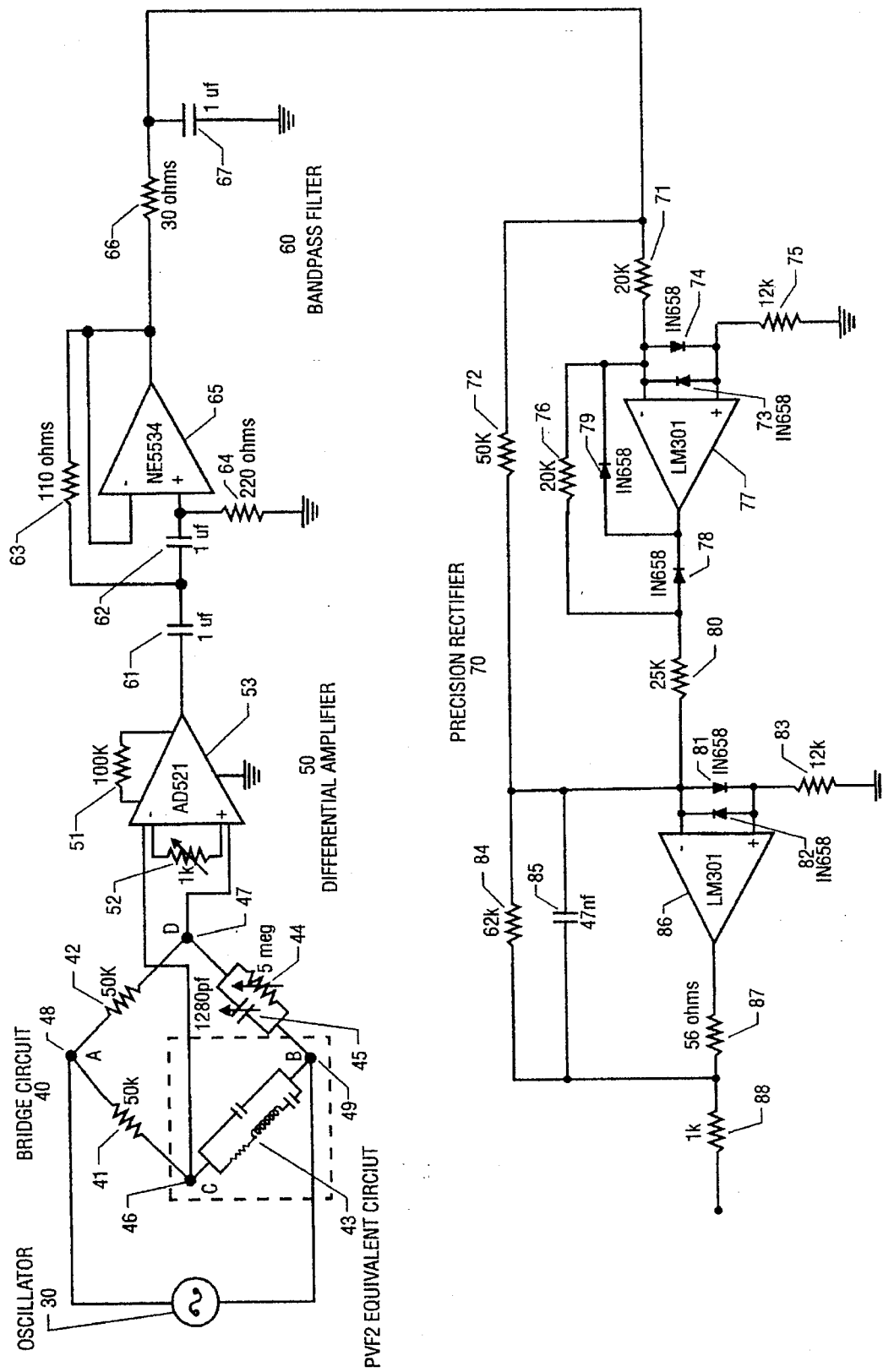
FIG. 2 is a drawing of a circuit containing the foil and processing means to improve signal quality.

An example of the practice of the present invention follows, making reference to FIGS. 1 and 2 above.

A PVF2 (polyvinylidene fluoride) foil 23 is suspended in a resonator assembly 10. The resonator assembly consists of a resonator base 11, two fixed base stands 18,20 and a movable stand 19. The PVF2 foil 23 is suspended between the moveable stand 19 and fixed stand 18. The tension is adjusted by a screw 12. The moveable stand is stabilized by two side shims 13a,13b. The side shims are connected to the fixed stands with side screws 15a,15b,15c,15d. A section is cut out at the bottom of the base to further enable the moveable stand to slide. A bottom plate 21 is used to shield the sectioned area and help guide the moveable stand 19. The fixed stand 18 has an aluminum base 18b and a plexiglass insulator 18a. One end of the foil 23 is between the plexiglass insulator 18a and aluminum base 18b. Two screw/nut fasteners 16a,16b are used to clamp the PVF2 foil between the plexiglass insulator 18a, and aluminum base 18b and also to attach the fixed stand assembly to the resonator base. The moveable stand 19 has an aluminum base 19b and a plexiglass insulator 19a. One end of the foil 23 is between the plexiglass insulator 19a and aluminum base 19b. Two screw/nut fasteners 16c,16d are used to clamp the PVF2 foil 23 between the plexiglass insulator 19a, positive electrode 22 and aluminum base 19b. Since each clamped edge of the foil is held along the entire edge rather than at a single point, torsional vibration is reduced. The positive electrode 22 is connected to the hot wire 14b of the 50Ω coaxial cable 14. The moveable stand base 19b is threaded within to ride the tension screw 12 to allow tension adjustment. The second fixed stand 20 is composed of three parts. The first part is an aluminum base 20a and two screw/nut fasteners 16e,16f used to attach the fixed stand assembly to the resonator base 11. The ground wire 14a is connected to the fixed base using a fastener 16e.

The circuit assembly of FIG. 2 is composed of an oscillator 30, bridge circuit 40, differential amplifier 50, bandpass filter 60, and a precision rectifier 70.

The oscillator 30 provides the excitation to the bridge circuit 40 to excite the foil's resonant frequency. One arm of the bridge circuit 40 contains the foil 43. The bridge circuit 40 is used to provide two potential points 46,47, one point 46 connected to the foil 43 and the other point 47 connected to the balancing arm which comprises a variable capacitor 45 and a variable resistor 44. As the infrared radiation impinges on the foil 43, the foil's resonant frequency changes due to the pyroelectric effect. This change causes an imbalance in the bridge or a difference in potential between the two points 46,47. This difference is measured and amplified by the differential amplifier 50. Once amplified the signal is then passed through a bandpass filter 60 to reduce unwanted noise. The signal is then rectified using the precision rectifier circuit 70. In this way a DC response is obtained and therefore no chopping device is necessary to provide information about static temperatures.

The oscillator 30 is set to excite the resonance frequency of the suspended foil 43. The oscillator 30 is connected to the bridge circuit 40 at points 48 and 49. The amplitude of the oscillator's output voltage is set to 5V peak. The fixed arms of the bridge circuit 40 consist of two 50k resistors 41,42. The piezoelectric film 43 is located in the bridge detector arm and is represented as a standard equivalent circuit. By adjusting the variable capacitor 45 and variable resistor 44 in the balancing arm, the potential difference between points 46 and 47 on the bridge circuit will be equal and the bridge will be in balance. When infrared radiation strikes the foil 43 it causes a change in the resonant frequency of the foil. This creates an imbalance in the bridge circuit 40. The difference in potential from point 46 to 47 is measured and amplified by the differential amplifier 50. The amplifier gain is set by the feedback resistor 51 and variable resistor 52. The integrated circuit 53 used for amplification is an AD521 (Analog Devices). The output of the differential amplifier 50 is connected to a bandpass filter 60. The low frequency cutoff is determined by the time constant set by the capacitors 61 and 62 in conjunction with resistors 63 and 64. The integrated circuit 65 NE5534 (Signetics) is used to implement the two pole filter. A single pole low pass filter is used for the high frequency cutoff. The cutoff frequency is determined by the time constant set by resistor 66 and capacitor 67. The output of this filter is connected to a precision rectifier 70. The precision rectifier 70 makes use of two inverting gain amplifiers. The integrated circuits 77 and 86 used for the amplifiers are two LM301 (National Semiconductor). Voltage rectification is achieved through diodes 78 and 79. The resistors 71, 75 and 76 are used to set the gain for the first amplifying stage. Diodes 73 and 74 provide an offset input voltage for precision rectification. The resistors 80, 83, 84, 87 are used to set the gain for the second amplifying stage. Diodes 18 and 82 provide an offset input voltage for precision rectification. The capacitor 85 is used in conjunction with resistor 84 to set a time constant for filtering high frequency noise. The resistor 88 is used to set the output resistance. The resistor 72 is used to provide feedback for additional loop stability.

Coating the foil with a light and heat absorbing substance such as graphite gives increased infrared radiation absorption, thus increased sensitivity.

Figure 3:
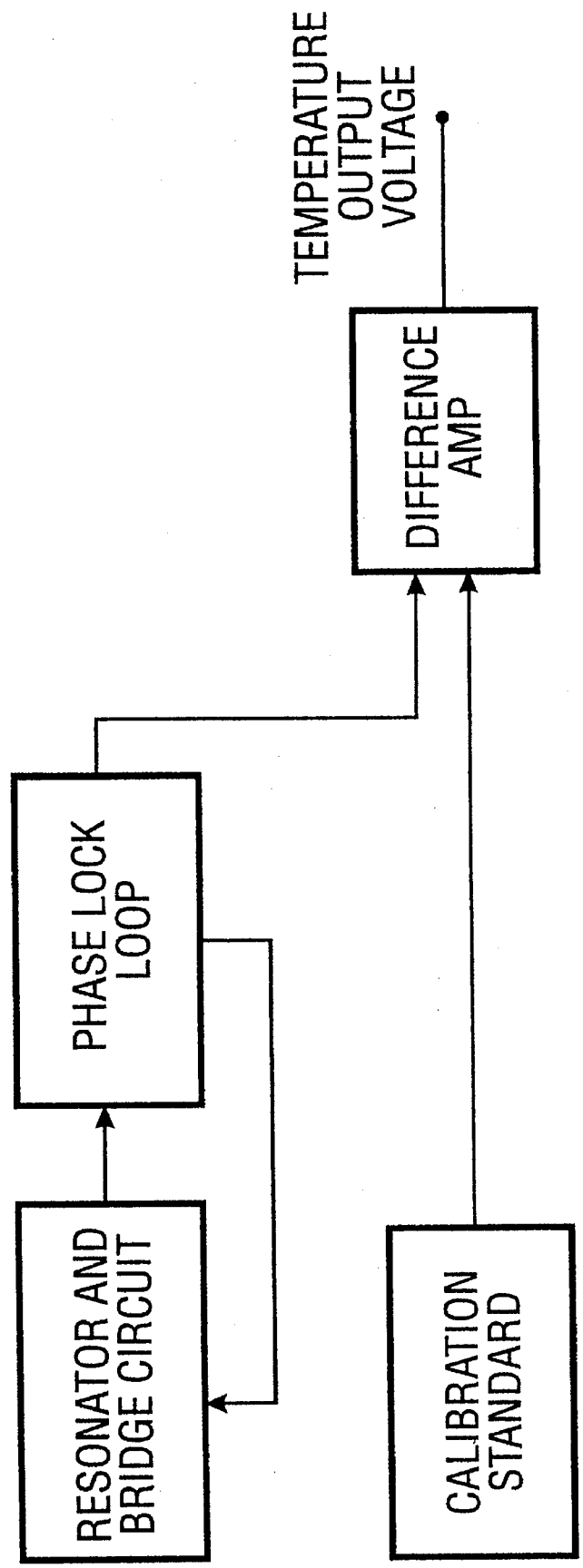
FIG. 3 is a block diagram of an embodiment employing a phase locked loop and a calibration standard.

A phase locked loop (PLL) could be implemented as shown in FIG. 3. As the foil's resonant frequency changes the PLL oscillator tracks the frequency. Temperature readings could then be determined by observing the change in PLL oscillator frequency. PLLs are further discussed in Heyman (U.S. Pat. No. 4,624,142) herein incorporated by reference. A standard tracking oscillator could be used as the oscillator 30 to provide frequency tracking information.

Other variations will be readily apparent to those of skill in the art. The forgoing is not intended to be an exhaustive list of modifications but rather is given by way of example. It is understood that it is in no way limited to the above embodiments, but is capable of numerous modifications within the scope of the following claims.

We claim:

1. An active pyroelectric infrared detector, comprising:
    a resonator assembly;
    a foil having both pyroelectric and piezoelectric properties, the foil being supported in the resonator assembly such that it is free to vibrate;
    means for electrically stimulating the foil to vibrate at a resonance frequency;
    a balanced bridge circuit having the foil as one arm of the bridge; and
    circuitry responsive to imbalances in the bridge circuit, the imbalances caused by changes in the resonance frequency of the foil, the changes caused by infrared radiation incident to the foil.

2. An active pyroelectric infrared derector according to claim 1, wherein the resonator assembly reduces torsional vibration of the foil.

3. An active pyroelectric infrared detector according to claim 1, wherein the circuitry responsive to imbalances comprises:
    a differential amplifier responsive to imbalances in the bridge circuit;
    a bandpass filter, receiving a signal from the differential amplifier; and
    a precision rectifier, receiving a signal from the bandpass filter.

4. An active pyroelectric infrared detector according to claim 1, wherein the balanced bridge circuit further comprises:
    four nodes, a first node being connected to a second node and a third node, a fourth node being connected to the second node and the third node;
    the connection between the first node and the second node comprising an element having a known resistance;
    the connection between the first node and the third node comprising an element having a known resistance;
    the connection between the second node and the fourth node comprising the foil; and the connection between the third node and the fourth node comprising a variable capacitor in parallel with a variable resistor, the capacitor and resistor being adjusted to place the bridge circuit in balance.

5. An active pyroelectric infrared detector according to claim 4, wherein the means for electrically stimulating the foil to vibrate comprises an oscillator having a first lead and a second lead, the first lead attached to the first node of the bridge circuit, the second lead attached to the fourth node of the bridge circuit, the oscillator oscillating at a frequency chosen to electrically stimulate the foil to vibrate at a resonance frequency.

6. An active pyroelectric infrared detector, comprising:

a resonator assembly;

a bridge circuit having four nodes, a first node being connected to a second node and a third node, a fourth node being connected to the second node and the third node, the connection between the first node and the second node comprising an element having a known resistance, the connection between the first node and the third node comprising an element having a known resistance, the connection between the second node and the fourth node comprising a foil, the foil having both pyroelectric and piezoelectric properties, the foil further being supported in the resonator assembly in such a way that it is free to vibrate, the connection between the third node and the fourth node comprising a variable capacitor in parallel with a variable resistor, the capacitor and resistor being adjusted to place the bridge circuit in balance;

an oscillator having two output leads, a first output lead connected to the first node of the bridge circuit, a second output lead connected to the fourth node of the bridge circuit, the oscillator oscillating at a frequency chosen to stimulate the foil to vibrate at a resonance frequency;

a differential amplifier with two input leads, a first input lead connected to the second node of the bridge circuit, a second input lead connected to the third node of the bridge circuit;

a band pass filter receiving an amplified output signal from the differential amplifier; and a precision rectifier receiving a filtered output signal from the band pass filter.

7. An active pyroelectric infrared detector as in claim 6, further comprising a phase locked loop in feedback to the bridge circuit, a change in the frequency of the phase locked loop indicating a change in the resonance frequency of the bridge circuit.

8. A device for making noncontact temperature measurements comprising:

a resonator assembly;

a foil having both pyroelectric and piezoelectric properties, the foil being supported in the resonator assembly such that it is free to vibrate;

means for electrically stimulating the foil to vibrate at a resonance frequency;

a balanced bridge circuit having the foil as one arm of the bridge; and circuitry responsive to imbalances in the bridge circuit, the imbalances caused by changes in the resonance frequency of the foil, the changes caused by infrared radiation incident to the foil; and means for comparing an output of the circuitry to a calibration standard for determining an absolute temperature reading.

9. A method of infrared detection comprising:

providing a resonator assembly;

providing a foil having both pyroelectric and piezoelectric properties;

supporting the foil in the resonator assembly such that it is free to vibrate;

providing means for electrically stimulating the foil to vibrate at a resonance frequency;

activating the foil by electrically stimulating the foil to vibrate at a resonance frequency;

providing a balanced bridge circuit having the foil as one arm of the bridge;

providing circuitry responsive to imbalances in the bridge circuit;

exposing the activated foil to infrared radiation; and monitoring the circuitry responsive to imbalances in the bridge circuit.

* * * * *